(12) United States Patent
Rebernig et al.

(10) Patent No.: US 11,895,755 B2
(45) Date of Patent: Feb. 6, 2024

(54) PREDICTIVE AND ADAPTIVE LIGHTING CONTROL METHOD AND PREDICTIVE AND ADAPTIVE LIGHTING SYSTEM

(71) Applicant: REBERNIG SUPERVISIONI SRL, Granarolo dell'Emilia (IT)

(72) Inventors: Massimo Rebernig, Granarolo dell'Emilia (IT); Davide Raggini, Cesena (IT); Davide Samori, Ozzano dell'emilia (IT)

(73) Assignee: REBERUIG SUPER VISIONI SRL, Granarolo dell Emilia (IT)

(*) Notice: Subject to any disclaimer, the term of this patent is extended or adjusted under 35 U.S.C. 154(b) by 109 days.

(21) Appl. No.: 17/625,146

(22) PCT Filed: Jul. 3, 2020

(86) PCT No.: PCT/IB2020/056305
§ 371 (c)(1),
(2) Date: Jan. 6, 2022

(87) PCT Pub. No.: WO2021/005479
PCT Pub. Date: Jan. 14, 2021

(65) Prior Publication Data
US 2022/0272815 A1    Aug. 25, 2022

(30) Foreign Application Priority Data
Jul. 10, 2019    (IT) .................. 102019000011304

(51) Int. Cl.
*H05B 47/12*    (2020.01)
*H05B 47/125*    (2020.01)
(Continued)

(52) U.S. Cl.
CPC ........... *H05B 47/12* (2020.01); *H05B 47/125* (2020.01); *H05B 47/155* (2020.01);
(Continued)

(58) Field of Classification Search
CPC ...... H05B 47/19; H05B 47/18; H05B 47/165; H05B 47/155; H05B 47/125; H05B 47/12;
(Continued)

(56) References Cited

U.S. PATENT DOCUMENTS 8,847,750 B1    9/2014    Malakuti
2016/0050397 A1*    2/2016    Di Giamberardino ..................... H05B 47/175
                                                                        315/149
(Continued)

FOREIGN PATENT DOCUMENTS

WO    2012140152 A1    10/2012

OTHER PUBLICATIONS

Piyush et. al. "Vehicle detection and classification using audio-visual cues", 3rd International Conference on Signal Processing and Integrated Networks (Spin), IEEE, Feb. 11, 2016.
(Continued)

*Primary Examiner* — Raymond R Chai
(74) *Attorney, Agent, or Firm* — Schott, PC.

(57) ABSTRACT

A lighting system comprising a plurality of controllable lighting devices (15) distributed in an area to be illuminated and an artificial intelligence (20) adapted to learn traffic data and to determine the lighting settings of said plurality of controllable lighting devices (15), wherein said artificial intelligence (20) comprises: —a plurality of intelligent devices (22) arranged in said area, each associated with at least one of said controllable lighting devices (15), wherein each intelligent device (22) comprises sound sensing means (25) adapted to acquire sound data and a local neural network (21a) adapted to learn traffic data based on the acquired sound data, to predict local traffic events and to process local lighting commands, within predetermined
(Continued)

lighting setting limits, for the at least one associated controllable lighting device, —at least one general neural network (21b) remote with respect to the plurality of intelligent devices (22), and —sound training means comprising image sensing means (30), sound sensing means (25) and a neural training network (21c) cooperating therewith to associate simultaneously sensed image data and sound data to create sample soundtracks (18) of a same scene to thereby teach the artificial intelligence (20) to recognize and classify traffic sounds, wherein said at least one general neural network (21b) is adapted to receive traffic data from said plurality of intelligent devices (22) and to process said traffic data to modify the lighting setting limits of the plurality of controllable lighting devices (15), wherein said at least one general neural network (21b) comprises transmission means adapted to transmit said modified lighting setting limits to the plurality of intelligent devices (22).

17 Claims, 3 Drawing Sheets

(51) Int. Cl.
*H05B 47/19* (2020.01)
*H05B 47/155* (2020.01)
*H05B 47/18* (2020.01)
*H05B 47/165* (2020.01)
*G06N 3/08* (2023.01)

(52) U.S. Cl.
CPC ............ *H05B 47/165* (2020.01); *H05B 47/18* (2020.01); *H05B 47/19* (2020.01); *G06N 3/08* (2013.01)

(58) Field of Classification Search
CPC .......... G08G 1/056; G08G 1/052; G08G 1/04; G08G 1/015; G08G 1/0133; G08G 1/0129; G08G 1/0116; G05V 20/52; G06N 3/08
See application file for complete search history.

(56) References Cited

U.S. PATENT DOCUMENTS

2019/0008019 A1  1/2019  Hénaff et al.
2019/0050647 A1  2/2019  Malkes et al.
2021/0312725 A1* 10/2021  Milton .................. G07C 5/008

OTHER PUBLICATIONS

Search Report for related PCT/IB2020/056, dated Apr. 11, 2020.

* cited by examiner

PREDICTIVE AND ADAPTIVE LIGHTING CONTROL METHOD AND PREDICTIVE AND ADAPTIVE LIGHTING SYSTEM

The present invention relates to a predictive and adaptive lighting control method and a relative lighting system. The invention was made with particular reference to public lighting, in particular road lighting, however the applicability to private lighting is not excluded, for example corporate, industrial, shopping centres, household etc. The general objective is energy efficiency.

BACKGROUND ART

One of the most significant documents on the energy efficiency of lights in patent literature is EP2719258.

This document proposes to modify the parameters of public lighting through current or expected weather data.

This system is interesting but it does not take into consideration the current methods and design legislation of lighting systems and does not appear to be of real assistance in actual energy saving, which should likewise be based on the intensity of use of the area.

Current lighting technology design criteria provide a first sizing of the lighting based on the geometry of the areas to be lit, whereby measuring parameters are taken into consideration, such as the length or width of the roads, etc.

Sizing proceeds by making changes based on risk variables, such as for example, the presence of crossroads, corners, etc.

Finally, it is desirable for the design to take into consideration actual traffic variables. However, the data relative to the latter are rarely available.

In fact, a cautionary ratio is applied that tends to light more than what is really required.

Added to this is the fact that in many countries there is road lighting technology classification legislation, and the system is to illuminate based on the appurtenant lighting technology classes. The classes are assigned in a cautionary manner, whereby they often provide greater lighting than necessary. In general, class lowering rules are provided based on the actual traffic conditions, but given that the data thereon are difficult to obtain and often lacking, the waste of energy on roads to date remains at an unacceptable level.

A further document in the field is US2019/0008019, which describes a system for controlling the intensity of public lighting based on the perception and processing of images. US2019/0008019 aims at a minimal communication system between lighting points. In particular, the lighting points change light intensity when a movement is perceived in the visual field or a change in intensity of a nearby street lamp is perceived. In this way, the street lamps communicate with the ones nearby without the need for a complex system.

This system allows keeping the lighting at a low level when it is not required, but it does not allow lowering the lighting technology classes initially assigned to the project because it does not allow having traffic data.

Said system also has other disadvantages, in particular the cameras are costly, they have a limited sensing radius whereby there are to be several of them, and they can be tricked if there are shields in the visual field such as, for example trees that change their foliage seasonally or road signage. Moreover, the visual system described is effective only for sensing "movement", but it is not capable of effectively sensing a stopping, for example for a conversation between people, which equally requires lighting.

US2019/0008019 also suggests an alternative system in which the lighting is controlled through a sound sensing rather than through a visual sensing. In this regard, the street lamps are provided with microphones and the system has a control and communication unit that establishes which street lamp is closest to the sound source, and it increases the intensity thereof. Therefore, this solution is more complex than the preceding one, but it also does not provide traffic data and therefore the possibility of prediction is lacking, thus not allowing the lighting technology class initially assigned to the project to be lowered.

Finally, US2019/0008019 suggests a hybrid between the visual and sound solution in which the street lamps initially are turned OFF, and where the sound sensing is only used to turn them ON and make the visual system operational. Then, the decision is made to adjust or turn OFF the lighting unit, if other nearby sources already provide the scene with enough light.

A more complex system, in particular both adaptive and predictive, is described in US2016/0050397.

This system is adaptive because it aims to declassify lighting technology, and is predictive because is adjusts the light flow based on instant predictions of events. To achieve these goals, the system of US2016/0050397 makes use of a visual perception artificial intelligence, i.e. taught to learn and classify traffic data based on images.

In general, this system is very costly due to the main component required, that is the cameras. Moreover, its instant prediction ability and reactivity based on images alone are limited because while the cameras are arranged in an appropriate manner, the vision of the action field might not be optimal due to obstacles or orientations that provide overlapping of the vehicles. Moreover as is known, images are projections of light that bounces off objects and travels in a straight line alone, thereby it is not possible to perceive images from behind a crossroad or traffic sign or tree with one camera alone, therefore it is not possible to predict, for example the turns of the vehicles. To obviate this drawback, the number of cameras should be high, but this obviously would increase the costs.

A hybridization with the systems described by US2019/0008019 would simply result in an artificial intelligence with learning based totally on the images, as in US2016/0050397 where sound is only used to turn ON the scene and allow the viewing thereof.

The object of the present invention is to overcome all or some of the drawbacks of the known technique.

In particular, it is the general object of the present invention to increase the energy saving in the field of lighting.

It is a further general object of the present invention to provide a process and a lighting system that is predictive and adaptive, i.e. capable of self-learning traffic data and using them:

for adaptive purpose to lower lighting setting limits, such as the lighting technology class assigned to a project,
   and for predictive purpose to predict local events and adapt the lighting thereof to the setting limits,
all in alternative manner with respect to the known predictive and adaptive systems.

It is another further object of the present invention to improve the instant prediction and the reactivity with respect to the known systems with visual artificial intelligence.

It is another further object of the present invention to lower the cost of the predictive and adaptive system with visual artificial intelligence.

It is another further object of the present invention to make possible the light adaption in forecast of turns of a vehicle or in case of stopping.

GENERAL INTRODUCTION

According to a first general aspect thereof, the present invention relates to a predictive and adaptive lighting control method, characterized by the following steps:

providing a controllable lighting system of a predetermined area;

providing a sound perception artificial intelligence;

performing a sound training step of the artificial intelligence by means of images, wherein the latter is taught to recognize and classify traffic data from sound sensing operations; this step is characterized by a learning by association between simultaneous sound sensing operations and image sensing operations of a same scene, preferably in at least one zone of said area, thereby creating sample soundtracks (18);

after the sound training step by means of images:

a) performing at least one adaptive step, comprising:

a1) creating an historical traffic data report of the area based on sound sensing operations compared at least with the sample soundtracks (18);

a2) establishing at least lighting setting limits of the lit area based on the historical data report;

b) performing at least one predictive step comprising:

b1) predicting local traffic events based at least on sound sensing operations compared at least with the sample soundtracks (18);

b2) controlling the area lighting system to adapt to the predicted traffic events within the setting limits established by the adaptive step.

Advantageously, with respect to a visual perception artificial intelligence, after the training, the sound perception artificial intelligence of the present invention allows sensing operations of the visual field at a greater distance or in visually prohibited areas. Moreover, such method has a greater predictivity because it can distinguish various situations associated with a same image, thus creating different sample soundtracks for a same image, which are distinct from the sound diversity, such as a straight continuation or a turn. The method is also capable of collecting increased data with respect to a visual artificial intelligence because it can proceed with a processing by comparison and association of sound sensing operations following the training to obtain therefrom the learning of situations which can escape an image sensing.

Advantageously, the sound sensing artificial intelligence can be taken advantage of to correlate the vehicle traffic data with the levels of sound pollution and/or with the wear of the road infrastructures.

Another further advantage is the one of making possible the automatic signalling of anomalous events within the road context, such as by way of non-limiting example, automobile collisions.

Preferably, the visual and sound sensing zone is smaller than said area and can be modified, for example moved within said area.

Preferably, the step of establishing setting limits in the adaptive step comprises assigning a lighting technology classification to said area, and controlling the lighting system in the predictive step comprises the action of controlling said system based on said assigned classification.

According to certain preferred embodiments, the sound training step occurs by associating simultaneous localized sound and image sensing operations in one or more predetermined sample zones (19) which preferably overall are smaller than the area, while the sound sensing operations can be localized in the whole area in the step of creating the historical data report.

Advantageously, the overall cost of the system is particularly low because it takes advantage of a low number of image sensing means, which for example are cameras, and an increased number of sound sensing means, which for example are microphones, where the cost of the second is much lower than the cost of the first.

"Zones which overall are smaller than said area" means that the overall visual field of the image sensing means covers a smaller area than the whole lit area, or additionally or alternatively, that there are fewer image sensing means than there are sound sensing means.

Preferably, there are various sample zones during the sound training step by means of images. In this way, the number of image sensing means required is further reduced, it being possible to take advantage of the same means in different zones to increase the sample record of cases.

According to certain preferred embodiments of the invention, the sound training step by means of images comprises the step of processing the image sensing operations to recognize them and classify them based on the objects depicted, and to transfer such classification to the sound sensing operations to create said sample soundtracks corresponding with said image sensing operations.

For example and in general, the sound training step comprises the following:

simultaneously sensing a film (96) and a spectogram (98) relative to the scene shot in the video;

performing the visual recognition and a relative classification of at least a portion of video, by means of visual recognition software;

associating the portion of video with the corresponding portion of spectogram and transferring such classification thereto, thus creating a classified portion of spectogram, called sample soundtrack (18).

The classification for example, identifies the type of vehicle and/or of action it undertakes.

Preferably, the association is made for portions of spectogram above a predetermined sound pressure threshold, called silence threshold.

According to certain preferred embodiments, the method is characterized by the steps of predicting a traffic event [for example, a transit path, such as for example, a straight continuation or a turn] based on one or more sound sensing operations compared with the historical report and/or with the sample soundtracks, and controlling the lighting of a zone of the area involved by the event and/or a neighbouring zone [for example, the expected transit path] based on said prediction.

Preferably, the sound training step by means of images comprises the step of processing the sensing operations by associating the sound data and the image data to obtain sample soundtracks characterized by at least one of the following pieces of information:

sample sound sensing operation characteristic of the passage of an object; [object means in general a vehicle or living being, for example a pedestrian]

sample sound sensing operation characteristic of the passage of more than one object;

sample sound sensing operation characteristic of a predetermined number of objects [established by learning how many objects the sounds sensed belong to];

sample sound sensing operation characteristic of a predetermined type of object [for example if it is an automobile, a van, a motorbike or a pedestrian];

sample sound sensing operation characteristic of the stopping of an object [for example, pedestrians having a conversation, or an automobile stopped at the traffic lights];

sample sound sensing operation characteristic of a predetermined direction that a predetermined object follows [for example, if it will continue straight or turn].

According to certain preferred embodiments, the creation of the historical data report comprises at least the following self-learning steps based only on the sound sensing operations:

cleaning the sound signal of ambient noises not belonging to a vehicle or pedestrian;
discriminating the type of object in transit;
discriminating the speed of the object in transit;
discriminating the direction of the object in transit;
discriminating the change in direction of the object in transit;
counting the objects in transit in given time periods.

Preferably, the action of counting the objects in transit comprises a plurality among said actions of cleaning the signal, discriminating the type of object, discriminating the speed of the object, discriminating the direction of the object, discriminating the change in direction of the object.

According to certain preferred embodiments, the method comprises any one of the preceding claims, characterized in that it performs the following operations:

mapping, in the adaptive step, the predetermined lit area by means of division into corresponding zones with lighting technology classes assigned based on at least one traffic characteristic learned by the artificial intelligence;

correcting, in the predictive step, an initial lighting activity for each zone based on the lighting technology class assigned; where the correction comprises for example, adjusting at least one from: damping, power, operating period, operating schedule, alternation of operating periods, turning ON or increasing brightness in relation to the prediction of a transit event, priority between zones, switching OFF priority for a controlled blackout, modulating the light flow upon request and in real time, in the presence of traffic.

Preferably, the method provides determining historical data and/or predictions on the traffic at least by recognizing the transit of vehicles by at least a characteristic operating sound thereof, comprising a sound or a combination of sounds from the following: engine noise, rolling noise of the tyres, noise due to aerodynamics, noises generated artificially by hybrid and electric vehicles.

Here, it for example is possible to recognize the characteristic operating sound by means of a frequency filter, for example to isolate those between 500 and 4000 Hz.

According to a second general aspect thereof, the invention relates to an adaptive and predictive lighting system comprising:

an area (10, 12) to be lit;
a plurality of lighting devices (15) distributed in said area, which are controllable to vary the lighting;
a sound perception artificial intelligence (20), the artificial intelligence comprising:
a) a plurality of intelligent devices (22) arranged in the area to be lit, each associated with one or some lighting devices to control them, where each intelligent device (22) comprises a local neural learning network (21a) of traffic data based on the sound, and sound sensing means (25) interacting with the local neural network to predict local traffic events and process subsequent local lighting commands, within predetermined limits, for the lighting devices with which it is associated,
b) at least one general neural network (21b) which is remote with respect to the intelligent devices (22) and communicates with each of them to receive traffic data and process them to establish relative adaptive modifications of lighting setting limits of the lighting means (15); the artificial intelligence comprising transmission means of such setting limits to the intelligent devices (for example, the general neural network decides a lighting technology class adaptation);

the lighting system further comprising:
sound training means (32) of the artificial intelligence by means of, preferably temporary, images, for example in a kit that is removable from the system, comprising image sensing means (30) and sound sensing means (25) of a same scene, and a neural training network (21c) cooperating therewith to associate simultaneous image and sound sensing operations to create sample soundtracks (18).

Preferably, the image sensing means can be removed from the system.

Just as preferably, the image sensing means are arranged in localized manner in one or more sample zones that overall are smaller than said area. For example, the image sensing means can be moved in different zones of said area.

According to certain preferred embodiments, said adaptive modifications of lighting setting limits comprise at least one from:

modifying at least one lighting technology class previously assigned to the area or to a zone thereof;
and said local lighting commands comprise:
temporarily modifying the lighting of a zone of the area based on a prediction of a temporary traffic event predicted by the processing means by comparison between one or more sound sensing operations and at least one from:
a) a sound sensing operations historical report obtained after the training step,
b) at least one sample soundtrack (18) obtained during the training step.

Embodiments in which there are only the characteristics for obtaining the adaptive function or the predictive function alone are not excluded.

DETAILED DESCRIPTION

Further characteristics and advantages of the present invention will become clearer from the following detailed description of the preferred embodiments thereof, with reference to the appended drawings and provided by way of indicative and non-limiting example. In such drawings:

FIGS. 2 and 3 show the histogram of the composition in frequency of the sound emitted respectively by a lightweight vehicle and by a heavy vehicle when it passes by;

For the purposes of the present invention, we conventionally consider the term "traffic" as a generic word that comprises the passing by or stopping of any object, animate such as a living being, or inanimate such as a vehicle 85, that requires subsequent lighting. Therefore, "traffic" is intended both outdoor transit, such as for example on a road, and indoor transit, such as in household environments. The lit area involved by the system of the present invention is therefore both public and private, both outdoors and indoors.

Figure 1:
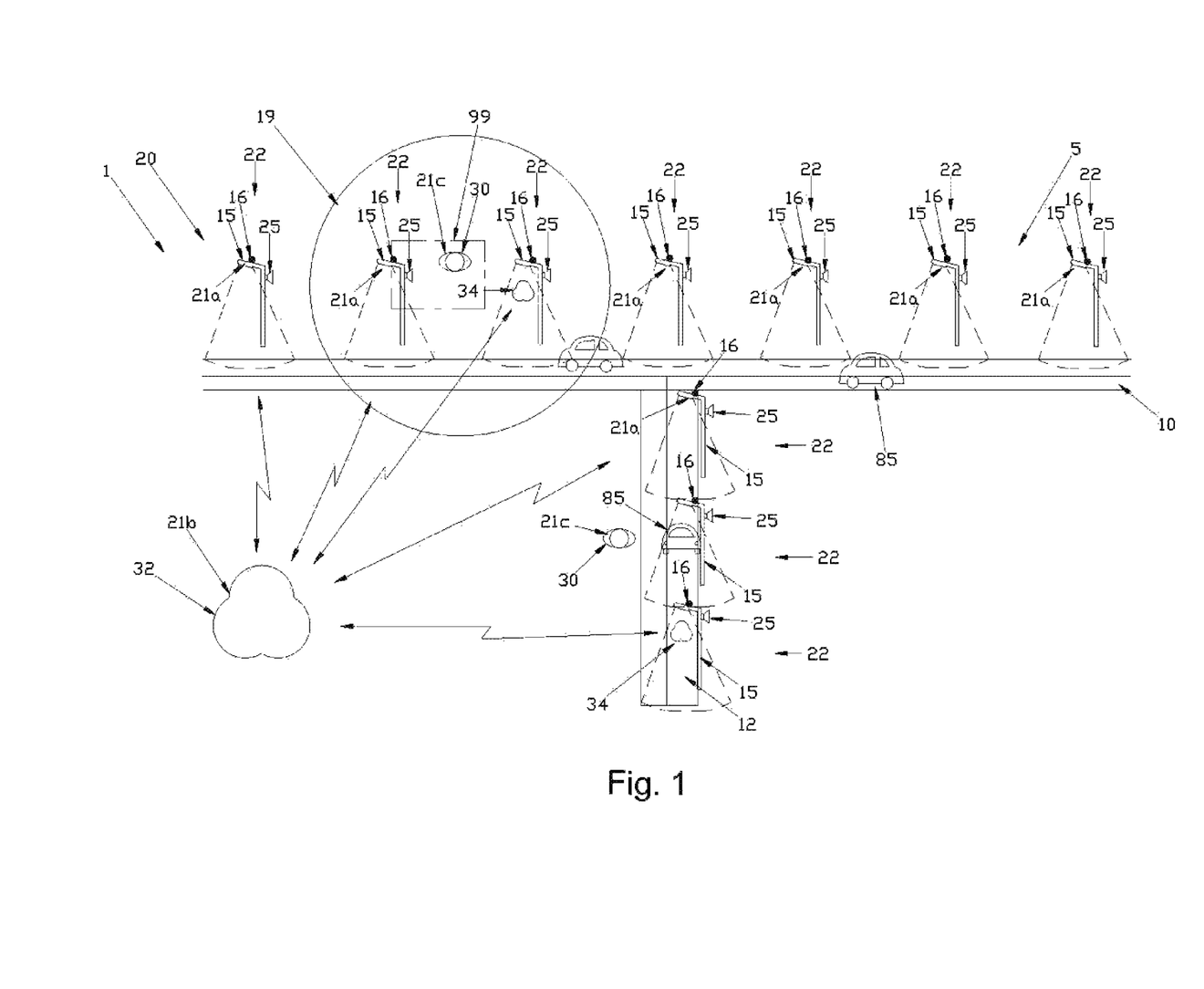
FIG. 1 shows a predictive and adaptive lighting system according to the present invention.

With reference to FIG. 1, it shows an example and/or case of use of a lighting system according to the present invention, indicated as a whole with reference number (1).

The system (1) comprises a monitored area (5) in which there are for example, various roads (10) and (12).

The system (1) comprises a plurality of lighting devices (15), for example street lights, distributed in the area, generally along the roads, each controlled by means of control means (16) to vary the lighting settings, they for example, being adjustable. Each control means (16) can be provided with any data network topology, for example wireless networks LPWAN, WIFI, 4G, 5G or equivalent cabled networks.

The system also comprises a sound perception artificial intelligence (20) for learning traffic data and the relative determination of the lighting and/or lighting technology classification settings.

The artificial intelligence comprises a plurality of intelligent devices (22) arranged to cover the monitored area (5), where each intelligent device comprises a local neural network (21a) for learning traffic data based on sound and for processing local lighting commands; the intelligent devices further comprise sound sensing means interacting with the local neural network, for example one or more microphones (25).

Preferably, the intelligent devices (22) are coupled to the lighting devices, there for example, being one for each lighting device (15). However, embodiments that are less costly but in any case effective are possible, where only a portion of the lighting devices (15) is coupled to intelligent devices (22), therefore provided with microphones (25) in communication with at least one local neural network (21a). In this last case, the remaining lighting devices (15) are preferably coupled to control means (16) to vary the lighting settings, they being for example, adjustable according to the indications of at least one nearby intelligent device (22).

The microphones are for example, of the MEMS type or similar, preferably integrated in the lighting device (15).

The artificial intelligence further comprises:
general processing means, preferably remote with respect to the intelligent devices, for example achieved through CLOUD computing means (32);
and at least one general neural network (21b) associated therewith.

The artificial intelligence also comprises:
local processing means, preferably comprised in the intelligent devices (22), achieved for example, by means of FOG/EDGE computing means (34), associated with one or more local neural networks (21a).

In particular, each general neural network (21b) allows processing traffic data, where the data processed come from the intelligent devices (22). It decides for example, the lighting technology classes, or more generally, the lighting patterns in which the intelligent devices can decide the local lighting settings, and transmits them to the intelligent devices. The general neural network also receives training information for recognizing traffic data and transmits them to the intelligent devices (22), as clarified below.

Through the local processing means, the intelligent devices decide local lighting settings within constraints set by said information received from the general neural network.

The communication for example, takes advantage of the data network topology, for example wireless networks LPWAN, WIFI, 4G, 5G or equivalent cabled networks, preferably the one of the control means of the lighting devices, so for example, the intelligent devices can be integrated therein.

The artificial intelligence also comprises training means (99), for example in kits that preferably can be at least partially associated with and disassociated from the system (1), so as to have a temporary use.

In particular, the training means comprise a neural training network (21c), sound sensing means and image sensing means (30) that cooperate with one another.

The sound sensing means can for example, be microphones (25) permanently present in the system (1), such as the microphones of the intelligent devices (22), or they can be microphones belonging only to the training kit and therefore removable from the system and movable in different points.

The image sensing means (30) comprise for example, one or more cameras. They preferably are movable in different points of the system and can be associated with and disassociated from it. They belong solely to the training kit and are preferably fewer in number than the microphones of the system.

As is clarified below, the image sensing means serve to teach the artificial intelligence to recognize and classify the traffic sounds, whereby it is sufficient to install them only in one or more points representative of the monitored area, or move them between the points. At the end of the teaching process, it is possible to also provide the removal thereof from the system (1). The image sensing means in the present invention therefore do not require to be spread throughout the whole network or to perpetually be a part thereof.

The sound perception artificial intelligence (20) acquires sound data and translates them into traffic data in the following manner.

The monitored area is divided into zones, for example each corresponding to a road or square, initially catalogued in a memory of the lighting system with a base appurtenant lighting technology category that establishes the initial lighting settings implemented; in particular it is preferable for the settings to establish schedules, duration and damping magnitude applicable, which is intended as a reduction of light flow. Such initial lighting technology class assigned is also called "project class".

In an initial learning step, it is possible to teach the artificial intelligence (20) to recognize the type of vehicle and/or traffic events from the sound spectogram. This can be done by sensing images of the vehicles in transit, preferably only in one or some sample zones (19) of the area of the system, by means of the visual sensing means. Different visual recognition software is present on the market that is capable of processing the images to recognize what they depict and to classify them based on their object, for example by associating them with a vehicle, which vehicle, or other. For the purposes of the present invention, any visual recognition software and automatic classification of images can be used, including one of those already on the market. Such classified images are associated with the sound spectrum registered simultaneously with the images, by transferring thereto the classification thereof and thus creating sample soundtracks (18).

Figure 4:
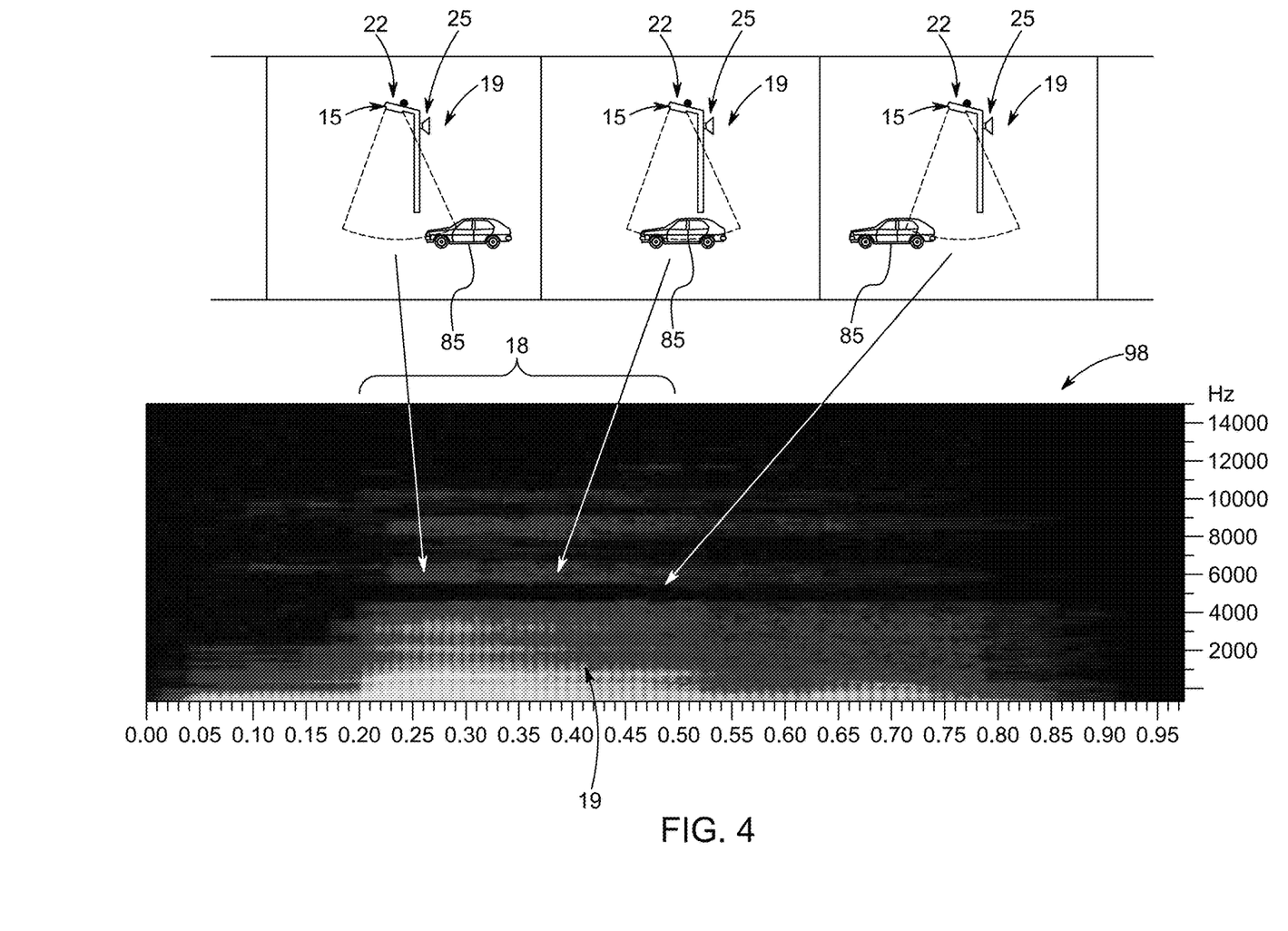
FIG. 4 shows the association of a soundtrack, called spectogram, and a visual track, in particular a sequence of frames of a video classified based on a visual recognition software.

Determining the sample soundtracks can occur for example, as shown in FIG. 4.

The training means (99) simultaneously sense a film (96) and a spectogram (98) relative to the scene shot in the video.

The spectogram in FIG. 4 shows the frequency composition of sound expressed in Hz, indicated to time expressed in seconds.

The training means then isolate the parts of the spectogram in which the frequency is greater than a predetermined threshold (19), called silence threshold, above which the system understands that something is happening. The training means then associate the portions of spectogram with corresponding portions of video. The portions of video are recognized and classified based on the visual recognition software and the training means transfer such classification to the corresponding portion of spectogram, obtaining sample soundtracks (18), that is classified portions of spectogram.

It is worth noting that the visual and sound recording frequency is different, whereby each frame of the video shot corresponds to a range of the soundtrack.

The system can also understand which vehicles are transiting, at what frequency, etc., whereby it is then possible to also generate statistical traffic data.

Once the system has been taught to classify sound by associating classified images sensed only in predetermined zones of the system, it is possible to move to a step of acquiring historical data using only sound sensing operations in the whole area of the neural network. The visual sensing means (30) can for example, be removed from the system and used in another similar, newly-installed system in a different area. They can in fact form a training kit that can be associated with and disassociated from the system.

In the step of acquiring historical data, the training data, that is the sample soundtracks, are transferred to the intelligent devices which therefore are autonomously capable of recognizing the events based on the sound, and of transferring the relative data to the general neural network (21b).

Once a first historical report of the traffic data sensed by means of sound taught by means of classified images is established, the general neural network (21b) processes them and assigns a corrective to each road with respect to the design lighting technology category, thus establishing a true zone mapping of the actual lighting needs as a function of traffic. The artificial intelligence then sends the lighting parameters to be implemented based on the new classes, such as for example the damping and/or tone profiles, to the intelligent devices.

Thanks to the training data (18) received, the intelligent devices (22) are also capable of autonomously making an instant behaviour prediction of the traffic and of adapting the performance of the lighting devices (15) within the lighting settings received from the artificial intelligence, in particular of the lighting technology class assigned to their zone, as a function of the actual needs.

The system is more efficient with respect to a system having visual perception alone because unlike light, sound is capable of overcoming obstacles; we can in fact perceive noise from behind a corner even if we cannot see what is causing it. Moreover, different noises can be associated with a same movement. Imagine for example, a vehicle nearing a crossroad: the engine noise is different if it intends continuing straight on or turning. This generates a discernment that is not possible for a visual perception artificial intelligence alone and results in general in a prediction provided in advance with respect to the continuation of the action of the vehicle that accordingly allows controlling the lighting means that are on the path, including those around a corner.

The system of the present invention is also capable of perceiving stopping noises, such as a running engine of a stopped vehicle, or the conversation between two people. Here, the system controls an appropriate lighting, something that a system based on a visual perception artificial intelligence alone could not do.

The system is also capable of being progressively refined because the neural network (21b) can continue acquiring and processing historical data in a continuous manner, and accordingly correct the lighting settings.

Also the training step can be progressive, generating training updates progressively transmitted to the intelligent devices (22).

The present invention is adapted to control any lighting variation, including the intensity and colour tone. For example, when people are sensed through steps or a voice, it could be desirable to change the tone, switching for example, from cold to warm light.

FIG. 1 shows an example in which the main road (10) intersects the closed road (12).

The two roads could have a same initial lighting technology category, then the closed road (12) is reclassified based on the traffic sound sensing operation to a lower class, giving lighting priority to the main road (10).

From a practical operational viewpoint, the noise generated by the vehicles originates from different components, all recognizable by the system, in particular:

1. combustion ENGINE: site of compressions, pops and decompressions. The sound emission levels depend on construction characteristics, rpm.

1.a electric ENGINE: site of hissing introduced by the control of power adjusted by the actuators. Noises generated artificially by means of acoustic devices adapted to signal the presence of the vehicle, for example below 20 km/h; pertinent legislation was recently introduced, such as for example UN-ECE R138.

2. ROLLING: noise caused by the entrapment/release of air in the cavities between tread and asphalt. Depends on the design of the tread and the makeup and porosity of the road surface.

3. AERODYNAMICS: relevant only for speeds >130 km/h.

The noise generated by the engine of motor vehicles at low speeds is greater than the noise generated by the rolling of the tyres on the asphalt. As the speed increases, the rolling noise increases in intensity up to prevailing over the noise generated by the engine.

Therefore, a measurement centred about sound contributions due to the rolling component of the sound allows the system to also deal with the increasing expansion on the market of electric vehicles and to catalogue roads intended for any speed.

Figure 2:
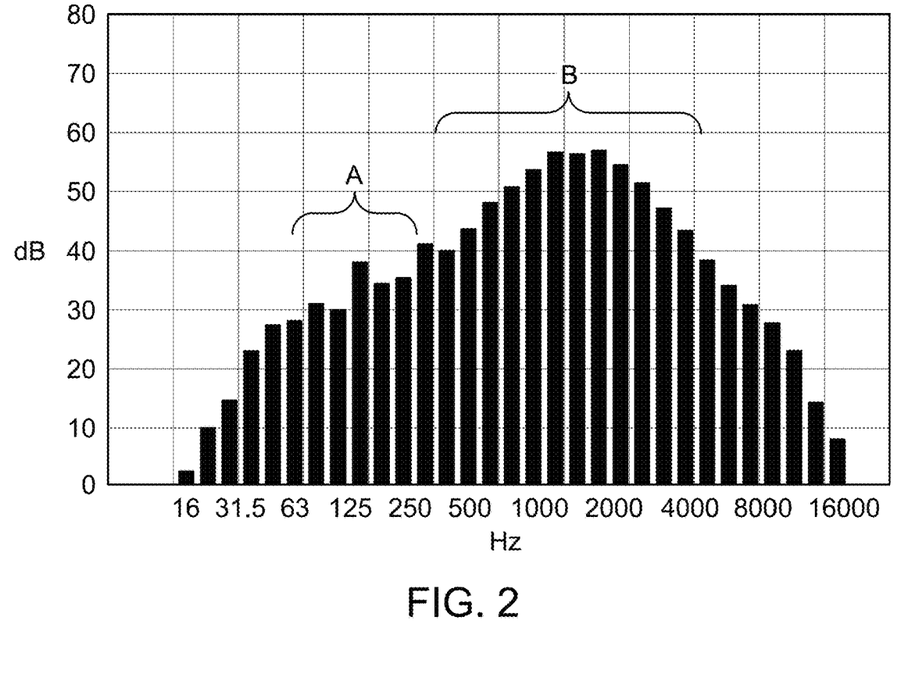
Figure 3:
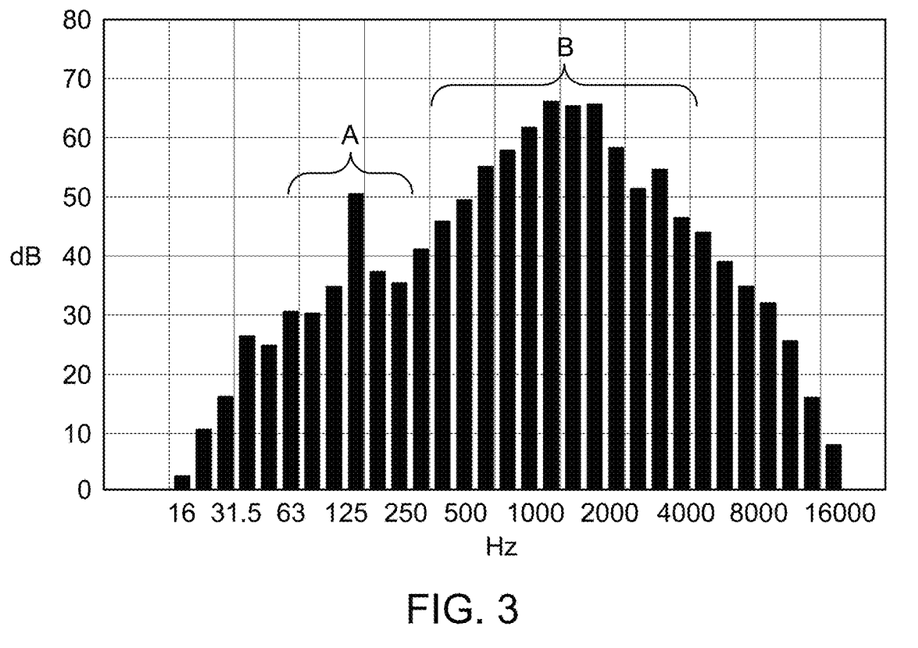

Concerning the spectrum of frequencies of the sound waves generated by a lightweight vehicle and by a heavy vehicle, taken for example respectively in FIGS. 2 and 3, it is worth noting how it is possible to discriminate the different types of noise source (engine A, rolling B, aerodynamics, etc.) based on the frequencies. It is worth noting that it is possible to filter the transduction of the signal into a specific frequency band, for example from 500 to 4000 Hz, thus processing only the sound contribution due to the rolling of the tyres.

This is useful for example, for counting the number of vehicles in transit or for establishing the periods of greater traffic congestion, etc.

GENERAL INTERPRETATION OF TERMS

In understanding the object of the present invention, the term "comprising" and its derivatives, as used herein, are intended as open-ended terms that specify the presence of declared characteristics, elements, components, groups, integers and/or steps, but do not exclude the presence of other undeclared characteristics, elements, components, groups, integers and/or steps. The above also applies to words that have similar meanings such as the terms "comprised", "have" and their derivatives. Furthermore, the terms "part", "section", "portion", "member" or "element" when used in the singular can have the double meaning of a single part or a plurality of parts. As used herein to describe the above executive embodiment(s), the following directional terms "forward", "backward", "above", "under", "vertical", "horizontal", "below" and "transverse", as well as any other similar directional term, refers to the embodiment described in the operating position. Finally, terms of degree such as "substantially", "about" and "approximately" as used herein are intended as a reasonable amount of deviation of the modified term such that the final result is not significantly changed.

While only selected embodiments have been chosen to illustrate the present invention, it will be apparent from this description to those skilled in the art that various modifications and variations can be made without departing from the scope of the invention as defined in the appended claims. For example, the sizes, shape, position or orientation of the various components can be modified as needed and/or desired. The components shown which are directly connected or in contact with each other can have intermediate structures arranged between them. The functions of one element can be performed by two and vice versa. The structures and functions of one embodiment can be adopted in another embodiment. All the advantages of a particular embodiment do not necessarily have to be present at the same time. Any characteristic that is original compared to the prior art, alone or in combination with other characteristics, should also be considered a separate description of further inventions by the applicant, including the structural and/or functional concepts embodied by such characteristics. Therefore, the foregoing descriptions of the embodiments according to the present invention are provided for illustrative purposes only and not for the purpose of limiting the invention as defined by the appended claims and their equivalents.

The invention claimed is:

1. A predictive and adaptive lighting control method, characterized by the following steps:
providing a controllable lighting system of a predetermined area;
providing a sound perception artificial intelligence;
performing a sound training step of the sound perception artificial intelligence by means of images, wherein the sound perception artificial intelligence is taught to recognize and classify traffic data from sound sensing operations characterized by a learning by association between simultaneous sound sensing operations and image sensing operations of a same scene, thereby creating sample soundtracks;
after the sound training step:
performing at least one adaptive step, comprising:
creating a historical traffic data report of the predetermined area based on sound sensing operations compared at least with the sample soundtracks;
establishing at least lighting setting limits of the predetermined area based on the historical traffic data report;
performing at least one predictive step comprising:
predicting local traffic events based at least on sound sensing operations compared at least with the sample soundtracks;
controlling the controllable lighting system to adapt to the predicted local traffic events within the setting limits established by the adaptive step.

2. The predictive and adaptive lighting control method according to claim 1, wherein the step of establishing lighting setting limits in the adaptive step comprises assigning a lighting technology classification to said predetermined area, and controlling the lighting system in the predictive step comprises controlling said lighting system based on said assigned classification.

3. The predictive and adaptive lighting control method according to claim 1, wherein the sound training step by means of images occurs by associating localized sound and image sensing operations in one or more predetermined sample zones which overall are smaller than the predetermined area, while the sound sensing operations are localized in the whole predetermined area in the step of creating the historical traffic data report.

4. The predictive and adaptive lighting control method according to claim 3, wherein there are various sample zones during the sound training step by means of images.

5. The predictive and adaptive lighting control method according to claim 1, wherein the sound training step by means of images comprises the step of processing the image sensing operations to recognize the images and classify the images based on the objects depicted, and to transfer such classification to the sound sensing operations to create sample soundtracks corresponding with said image sensing operations.

6. The predictive and adaptive lighting control method according to claim 1, wherein the sound training step comprises the following:
simultaneously sensing a film and a spectogram relative to the scene shot in the video;
performing the visual recognition and a relative classification of at least a portion of video, by means of visual recognition software;
associating the portion of video with the corresponding portion of spectogram and transferring such classification thereto, thus creating a classified portion of spectogram, called sample soundtrack.

7. The predictive and adaptive lighting control method according to claim 1, wherein the steps of predicting a traffic event based on one or more sound sensing operations compared with the historical traffic report and/or with the sample soundtracks, and controlling the lighting of a zone of the area involved by the event, and of a neighbouring zone, based on said prediction.

8. The predictive and adaptive lighting control method according to claim 1, wherein the sound training step by means of images comprises the step of processing the sensing operations by associating the sound data and the image data to obtain sample soundtracks characterized by at least one of the following pieces of information:
sample sound sensing operation characteristic of the passage of an object;
sample sound sensing operation characteristic of the passage of more than one object;

sample sound sensing operation characteristic of a predetermined number of objects;

sample sound sensing operation characteristic of a predetermined type of object;

sample sound sensing operation characteristic of the stopping of an object;

sample sound sensing operation characteristic of a predetermined direction that a predetermined object follows.

9. The predictive and adaptive lighting control method according to claim 1, wherein the creation of the historical traffic data report comprises at least the following learning steps based only on the sound sensing operations :

cleaning the sound signal of ambient noises not belonging to a vehicle or pedestrian;

discriminating a type of object in transit;

discriminating a speed of the object in transit ;

discriminating a direction of the object in transit ;

discriminating a change in direction of the object in transit;

counting the objects in transit in given time periods.

10. The predictive and adaptive lighting control method according to claim 9, wherein the action of counting the objects in transit comprises a plurality among said actions of cleaning the signal, discriminating the type of object, discriminating the speed of the object, discriminating the direction of the object, discriminating the change in direction of the object.

11. The predictive and adaptive lighting control method according to claim 1, wherein it performs the following operations:

mapping, in the adaptive step, the predetermined area by division into corresponding zones with lighting technology classes assigned based on at least one traffic characteristic learned by the artificial intelligence;

correcting, in the predictive step, an initial lighting activity for each zone based on the lighting technology class assigned; where the correction comprises for example, adjusting at least one from: damping, power, operating period, operating schedule, alternation of operating periods, turning ON or increasing brightness in relation to the prediction of a transit event, priority between zones, switching OFF priority for a controlled blackout, modulating the light flow upon request and in real time, in the presence of traffic.

12. The predictive and adaptive lighting control method according to claim 1, wherein it determines historical data and/or predictions on the traffic at least by recognizing the transit of vehicles by at least a characteristic operating sound thereof, comprising a sound or a combination of sounds from the following: engine noise, rolling noise of the tyres, noise due to aerodynamics, noises generated artificially by hybrid and electric vehicles.

13. The predictive and adaptive lighting control method according to claim 11, wherein it recognizes the characteristic operating sound by means of a frequency filter to isolate those between 500 and 4000 Hz.

14. A lighting system, comprising:

an area to be lit;

a plurality of lighting devices distributed in said area, which are controllable to vary the lighting;

a sound perception artificial intelligence, the artificial intelligence comprising:

a plurality of intelligent devices arranged in the area to be lit, each associated with one or some lighting devices to control them, where each intelligent device comprises a local neural learning network of traffic data based on the sound, and sound sensing means interacting with the local neural network to predict local traffic events and process subsequent local lighting commands, within predetermined limits, for the lighting devices with which it is associated, at least one general neural network which is remote with respect to the intelligent devices and communicates with each of them to receive traffic data and process them to establish relative adaptive modifications of lighting setting limits of the lighting means; the artificial intelligence comprising transmission means of such setting limits to the intelligent devices;

the lighting system further comprising:

sound training means of the artificial intelligence by means of images, comprising image sensing means and sound sensing means of a same scene, and a neural training network cooperating therewith to associate simultaneous image sensing operations and sound sensing operations to create sample soundtracks.

15. The lighting system according to claim 14, wherein the image acquisition means are removable from the system.

16. The lighting system according to claim 14, wherein the image acquisition means are arranged in localized manner in one or more sample zones which overall are smaller than said area.

17. A The lighting system according to claim 14 , wherein said adaptive modifications of lighting setting limits comprise at least one from:

modifying at least one lighting technology class previously assigned to the area or to a zone thereof;

and said local lighting commands comprise:

temporarily modifying the lighting of a zone of the area based on a prediction of a temporary traffic event predicted by the processing means by comparison between one or more sound sensing operations and at least one from:

a sound sensing operations historical report obtained after the training step, at least one sample soundtrack obtained during the training step.

* * * * *